HEATING AND COOLING UNIT
Filed Feb. 20, 1968
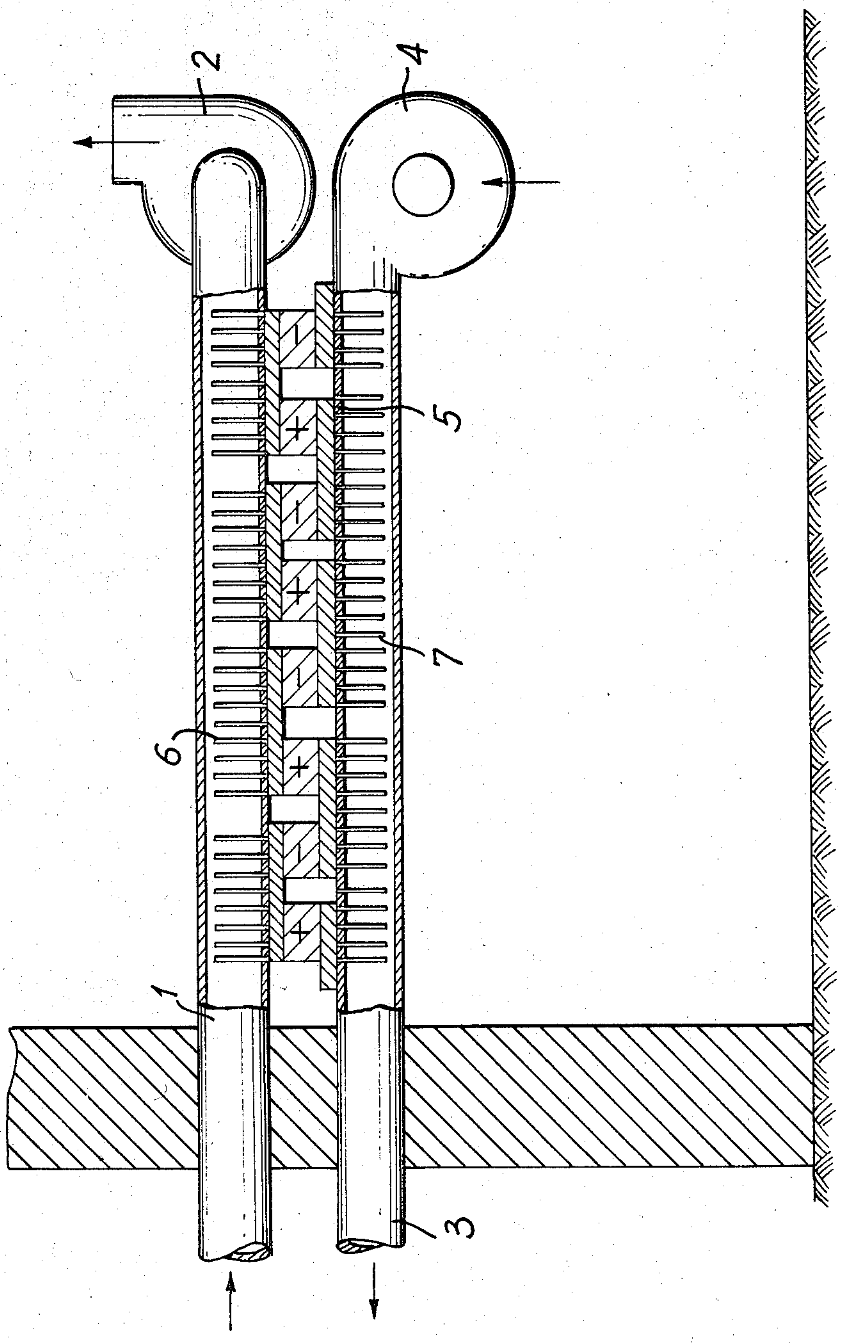

United States Patent Office 3,552,133 Patented Jan. 5, 1971

3,552,133
HEATING AND COOLING UNIT

Sergei Meerovich Lukomsky, Poselok Sokol, ul. Polenova 19, kv. 1, Moscow, U.S.S.R.

Filed Feb. 20, 1968, Ser. No. 706,861
Int. Cl. F25b *21/02*
U.S. Cl. 62—3 1 Claim

ABSTRACT OF THE DISCLOSURE

A heating and cooling unit comprises a semi-conductor thermoelectric generator having hot and cold junctions, the heat exchanging surfaces of one junction being located in a duct near the entrance thereof while the heat exchanging surfaces of the other junction are located in a second duct near the exit thereof, the arrangement being such that air is drawn through one duct from a first space to a second while the other duct conveys the air from the second space to the first, the air flowing in opposite directions in the ducts.

This invention relates to heating-and-cooling units, particularly to ventilating installations.

Heating-and-cooling units and air conditioners are known heretofore of the transistorized type, incorporating semiconductor thermoelectric generators and air fans; they are used for heating the air in the buildings in winter and cooling it in the summer.

The temperature difference between the hot and cold junctions in the known heating-and-cooling units ranges from 20 to 50° C. An object of the invention resides in ensuring a substantial reduction of this temperature difference and thus increasing sharply the efficiency of the unit.

The invention is based on an arrangement wherein the ventilating air forced into a building passes by one set of junctions of the semiconductor thermoelectric generators, being heated (in winter) or cooled (in summer) as compared with the outside air, whereas the air discharged from the same building passes by another set of junctions, being cooled (in winter) or heated (in summer) by a few degrees as compared with the outside air.

The above-described system of air circulation in a semiconductor thermoelectric generator makes it possible to achieve a minimum desired difference of temperatures between the hot and cold junctions, which produces a great economical effect.

Given below is a detailed description of the invention with reference to the accompanying drawing, the sole figure of which diagrammatically illustrates a transistorized heating-and-cooling ventilation unit.

The unit comprises an air duct 1 through which air is forced into a building, or other structure, by a fan 2; an air duct 3 through which air is discharged from the building by a fan 4, semiconductor thermoelectric generators 5 consisting of positive and negative semiconductors interconnected by conducting jumpers. The heat-exchanging surfaces 6 of the hot (or cold) junctions are arranged in the air duct 1 whereas the heat-exchanging surfaces 7 of the cold (or hot) junctions are located in the air duct 3. The heat-exchanging surfaces 6 and 7 have the form of an extended ribbed surface located in the air ducts 1 and 3.

In winter, electric current is supplied to the generators in such a manner that the junctions of the air duct 1 are hot and those of the air duct 3 are cold.

In winter, outside cold air at a temperature of, say, −30° is drawn in by the fan 2 and forced through the air duct 1 through the heat-exchanging surfaces 6 of the hot junctions of the thermoelectric semiconductor generator 5, being heated thereat to the required temperature, say +22°, and forced into the building.

The inside air at a temperature of, say +18°, is forced by the fan 4 through the air duct 3 and the heat-exchanging surfaces 7 of the cold junctions of the thermoelectric semiconductor generator, being cooled there to a temperature of, say −34°, and discharged into the atmosphere.

In summer, the current is reversed so that the hot junctions become cold and vice versa. The warm outside air at a temperature of, say +40°, is drawn in by the fan 2, forced through the heat exchanging surfaces 6 (of cold junctions in this case), is heated there to the required temperature, for example +22°, and forced into the building.

The air is received by the fan 4 from the building at a temperature of +26° C., forced through the heat-exchanging surfaces 7 (of hot junctions in this case), heated to a temperature of, say +44°, and discharged into the atmosphere.

In the accepted counterflow layout the difference of temperatures of the heated or cooled ventilating air on the one hand and the air discharged outside on the other is equal to 4° in the example in spite of the fact that the air is heated from −30° to +22° C., i.e. by 50°, and cooled from +40° to 22° C., i.e. by 18° C. In this counterflow system the difference between the heated and cooled air and the working medium may be made very small at will (in this case one should be guided by the considerations of economy).

Thus, if the temperature difference between the heated or cooled air and the working medium is small, the heating or cooling coefficients, i.e. the ratio of the useful heat or cold to the consumed electric energy may rise to high values, approximately 4–8. This means that 1000 kw. of consumed electric energy may produce from 4000 to 8000 kw. of heat or cold. These high heating or cooling transformation coefficients cannot be achieved at present by conventional methods. Under the above-mentioned working conditions, by means of conventional units, there can be achieved heating and cooling coefficients from 0.5 to 2 which means that every 1000 kw. of consumed electric energy produces from 500 to 2000 kw. of heat or cold instead of 4000–8000 kw. as ensured by the method acording to the invention.

What is claimed is:

1. A heating and cooling unit for a building comprising two ducts interconnecting a first space in the building and ambient atmosphere outside the building for the flow of air therebetween, semi-conductor thermoelectric generators having hot and cold junctions with heat-exchanging surfaces accommodated inside said ducts and within the building, the hot junctions being in one duct and the cold junctions in the other duct; fans for respectively displacing the air through one of said ducts from the first space to the ambient atmosphere and through the second duct from the ambient atmosphere to the first space, the air traveling in opposite directions in said ducts, the heat exchanging surfaces of one junction of one generator being located in one duct at the end of the flow and the heat exchanging surfaces of the other junction of the same generator being located in the beginning of the flow of the medium in the other duct whereby the space within the building can be thermally conditioned using air from the ambient atmosphere.

References Cited

UNITED STATES PATENTS

| | | | |
|---|---|---|---|
| 2,944,404 | 7/1960 | Fritts | 62—3 |
| 3,165,900 | 1/1965 | Huntington | 62—3 |
| 3,355,900 | 12/1967 | Castelet | 62—3 |

CHARLES SUKALO, Primary Examiner

U.S. Cl. X.R.

161—66